(12) United States Patent
Zhou

(10) Patent No.: US 8,737,510 B2
(45) Date of Patent: May 27, 2014

(54) WIRELESS COMMUNICATION SYSTEM, DEVICE AND METHOD

(75) Inventor: Liang Zhou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 259 days.

(21) Appl. No.: 13/160,723

(22) Filed: Jun. 15, 2011

(65) Prior Publication Data

US 2012/0014469 A1 Jan. 19, 2012

(30) Foreign Application Priority Data

Jul. 15, 2010 (JP) ................................ 2010-160473

(51) Int. Cl.
*H04B 7/02* (2006.01)
(52) U.S. Cl.
USPC ........ 375/267; 375/299; 375/260; 455/562.1; 455/101; 455/102
(58) Field of Classification Search
USPC ........ 375/267, 260, 295; 455/522, 121, 575.7
See application file for complete search history.

(56) References Cited

U.S. PATENT DOCUMENTS 8,086,273 B2 * 12/2011 Zhou ........................... 455/562.1
8,213,540 B1 * 7/2012 Lee et al. ...................... 375/299
2007/0281746 A1 * 12/2007 Takano et al. .............. 455/562.1
2008/0008258 A1 1/2008 Tanabe
2009/0285325 A1 * 11/2009 Zhou ............................. 375/267
2012/0087265 A1 * 4/2012 Tamaki et al. ................ 370/252

FOREIGN PATENT DOCUMENTS

JP 2008-17143 1/2008
JP 2009-182964 8/2009

OTHER PUBLICATIONS

Zhou Liang et al.,"Fast Recursive Algorithm for Efficient Transmit Antenna Selection in Spatial Multiplexing Systems" Vehicular Technology Conference Fall, IEEE 70th, pp. 1-5, Sep. 20, 2009.

* cited by examiner

*Primary Examiner* — Eva Puente
(74) *Attorney, Agent, or Firm* — Fujitsu Patent Center

(57) ABSTRACT

A wireless communication system includes an inverse matrix calculating unit which uses an inverse matrix of a channel matrix of a first combination of L antennas (where L is an integer, $1 \leq L \leq N$) selected from the N antennas, so as to calculate an inverse matrix of a channel matrix of a second combination of L antennas selected from the N antennas through an arithmetic operation, and an antenna selecting unit which selects a combination of L antennas from the N antennas as L antennas to be used for communication, the selected combination determining a reference value for antenna selection related to the inverse matrix calculated by the inverse matrix calculating unit so that the reference value for antenna selection fits a successive interference cancellation process carried out for a signal transmitted from the L antennas of the selected combination.

15 Claims, 11 Drawing Sheets

FIG. 6

TRANSMISSION ANTENNAS

| | 1 | 2 | 3 | 4 | 5 | 6 | 7 | 8 |
|---|---|---|---|---|---|---|---|---|
| SUBSET P1 | 1 | 2 | 3 | 4 | 5 | 6 | 7 | |
| SUBSET P2 | 1 | 2 | 3 | 4 | 5 | 6 | 8 | |
| SUBSET P3 | 1 | 2 | 3 | 4 | 5 | 7 | 8 | |
| SUBSET P4 | 1 | 2 | 3 | 4 | 6 | 7 | 8 | |
| SUBSET P5 | 1 | 2 | 3 | 5 | 6 | 7 | 8 | |
| SUBSET P6 | 1 | 2 | 4 | 5 | 6 | 7 | 8 | |
| SUBSET P7 | 1 | 3 | 4 | 5 | 6 | 7 | 8 | |
| SUBSET P8 | 2 | 3 | 4 | 5 | 6 | 7 | 8 | |

WIRELESS COMMUNICATION SYSTEM, DEVICE AND METHOD

CROSS-REFERENCE TO RELATED APPLICATIONS

This application is based upon and claims the benefit of priority of the prior Japanese Patent Application No. 2010-160473, filed on Jul. 15, 2010, the entire contents of which are incorporated herein by reference.

FIELD

The present invention relates to a technical field of a wireless communication system and a wireless communication device which perform, e.g., MIMO (Multiple Input Multiple Output) communication, and a method for wireless communication.

BACKGROUND

MIMO (Multiple Input Multiple Output) communication systems have been proposed as a wireless communication system which enhances transmission speed owing to space-division multiplexing or uses different propagation characteristics of plural paths so as to gain a diversity effect for achieving higher reliability. A wireless communication device (e.g., a transmitter) of a MIMO communication system having, e.g., a plurality of antennas can transmit data to a wireless communication device being another end of the communication (e.g., a receiver) by using the plural antennas at the same time.

As using lots of antennas, the MIMO communication system carries out a process by transmitting and receiving lots of data. Thus, as circuits, etc. connected to the antennas grows larger in size, cost, power consumption, etc., the MIMO communication system grows more complicated as a whole. Thus, arts for selecting a combination of antennas to be used for communication from all antennas so as to reduce the cost, complexity, power consumption, etc. are disclosed at Japanese Laid-open Patent Publications No. 2009-182964 and No. 2008-17143.

SUMMARY

According to an aspect of the embodiment, a wireless communication system includes an inverse matrix calculating unit which uses an inverse matrix of a channel matrix of a first combination of L antennas (where L is an integer, $1 \leq L < N$) selected from the N antennas, so as to calculate an inverse matrix of a channel matrix of a second combination of L antennas selected from the N antennas through an arithmetic operation, and an antenna selecting unit which selects a combination of L antennas from the N antennas as L antennas to be used for communication, the selected combination determining a reference value for antenna selection related to the inverse matrix calculated by the inverse matrix calculating unit so that the reference value for antenna selection fits a successive interference cancellation process carried out for a signal transmitted from the L antennas of the selected combination.

The object and advantages of the embodiment will be realized and attained by at least the features, elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 6 is an explanatory diagram for illustrating an example subset p in which transmission antennas of $L=7$ are selected from transmission antennas of $Nt=8$;

DESCRIPTION OF EMBODIMENTS

As a method for selecting a combination of antennas to be used for communication from all antennas as mentioned herewith, a method for selecting a combination of antennas so as to gain a high level of communication performance (e.g., a high level of communication throughput, a diversity gain, etc.) is known. According to that method, the communication performance, etc. is calculated through an arithmetic operation for every candidate of the combinations of the antennas, and a combination of the antennas which gains a high level of communication performance is selected. In a case, e.g., where a combination of L antennas is selected from N antennas (where L and N are integers, $1 \leq L < N$), the wireless communication device needs to calculate communication performance, etc., for every one of combinations as many as $_NC_L$ of the antennas through arithmetic operations. The increase of the number of antennas, however, causes a technical problem in that a huge amount of arithmetic operations is required.

What is described above is enumerated as an example of a problem to be solved by the invention. An advantage of some aspects of the invention is to provide a wireless communication system and a wireless communication device which, e.g., can properly select a combination of antennas to be used, and a wireless communication method.

The above problem can be solved by a wireless communication system which performs multiple input multiple output communication by using a wireless communication device having N antennas (where N is an integer, N≥2), the wireless communication system having an inverse matrix calculating unit and an antenna selecting unit. The inverse matrix calculating unit uses an inverse matrix of a channel matrix of a combination of L antennas selected from N antennas (where L is an integer, 1≤L<N), so as to calculate an inverse matrix of a channel matrix of another combination of L antennas selected from the N antennas through an arithmetic operation. The antenna selecting unit selects a combination of L antennas to be used for communication from the N antennas such that a reference value for antenna selection related to an inverse matrix calculated by the inverse matrix calculating unit meets a specific antenna selection criterion, the reference value being determined in accordance with a successive interference cancellation process carried out for signals to be transmitted by the L antennas.

According to the wireless communication system, the wireless communication device and the method for wireless communication disclosed herewith, a combination of antennas to be used can be properly selected.

One of most preferable embodiments of the invention will be explained with reference to the drawings hereafter. Incidentally, a wireless communication system exemplified by a MIMO (Multiple Input Multiple Output) wireless communication system will be explained hereafter.

(1) Configuration of MIMO Wireless Communication System

Figure 1:
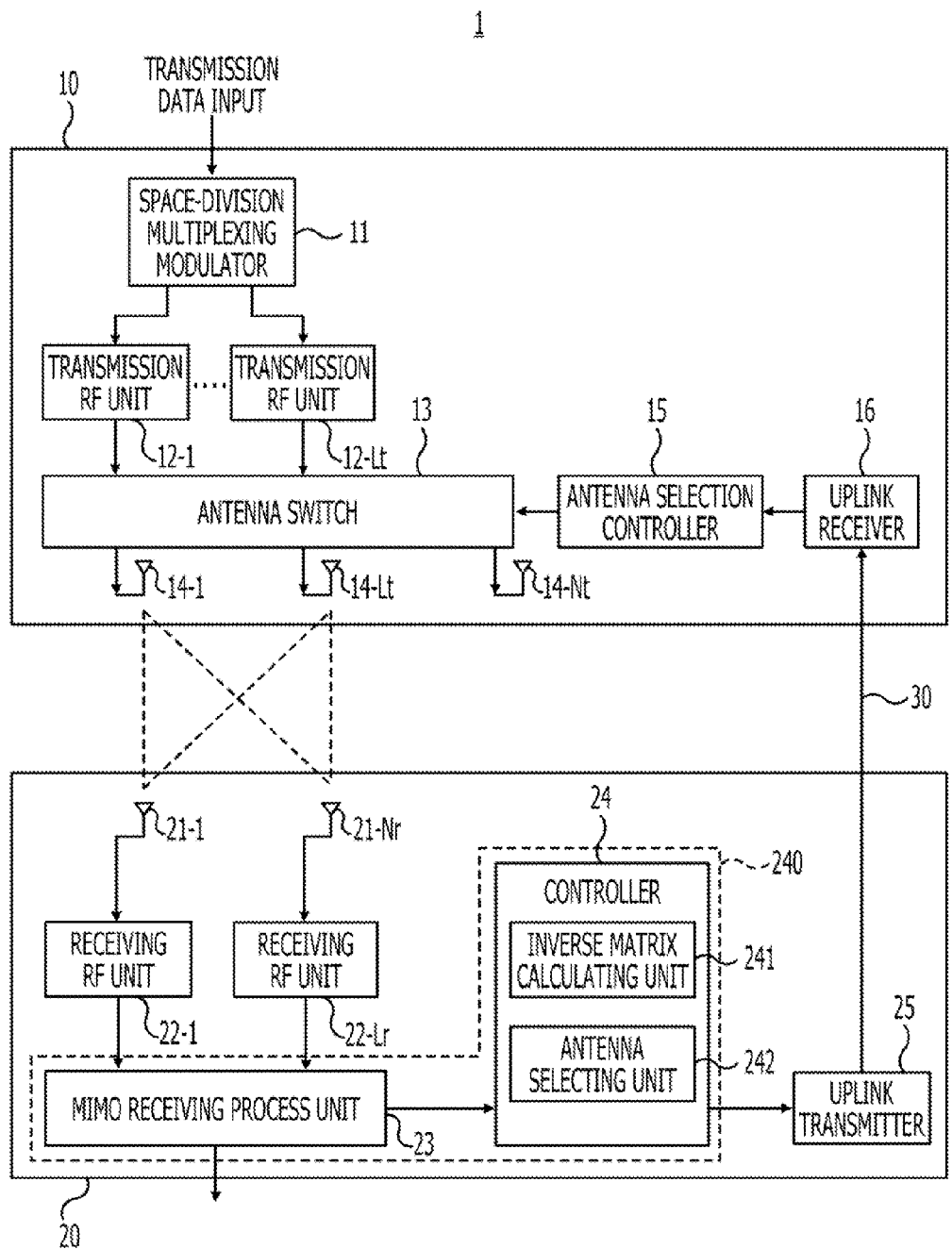
FIG. 1 is a block diagram which illustrates an example configuration of a MIMO wireless communication system of the embodiment.

An example configuration of a MIMO wireless communication system 1 of the embodiment will be explained with reference to FIG. 1. FIG. 1 is a block diagram which illustrates the example configuration of the MIMO wireless communication system 1 of the embodiment.

As illustrated in FIG. 1, the MIMO wireless communication system 1 of the embodiment has a wireless base station 10 and a mobile terminal 20 which are one and another specific examples of the "wireless communication devices", respectively. Incidentally, the wireless base station 10 and the mobile terminal 20 are being a transmitter and a receiver, respectively, on a downlink. Meanwhile, the wireless base station 10 and the mobile terminal 20 are being a receiver and a transmitter, respectively, on an uplink. Thus, the wireless base station 10 can have substantially the same configuration as that of the mobile terminal 20 described later in addition to or instead of a configuration of the wireless base station 10 described later. Similarly, the mobile terminal 20 can have a same configuration as that of the wireless base station 10 described later in addition to or instead of a configuration of the mobile terminal 20 described later.

The wireless base station 10 is exemplified by a wireless base station in a cellular phone system or a mobile communication system (e.g., an NB (Node B) or an e-Node B (evolved Node B)) or an access point in a wireless LAN system. Meanwhile, the wireless base station 10 can be any device as long as it can transmit (and/or receive) data. The mobile terminal 20 is exemplified by a cellular phone in a cellular phone system or a client terminal (e.g., a personal computer, etc.) in a wireless LAN system. Meanwhile, the mobile terminal 20 can be any device as long as it can receive (and/or transmit) data.

The wireless base station 10 has a space-division multiplexing modulator 11, transmission RF (Radio Frequency) units as many as Lt (where Lt is an integer, Lt≥2) given reference numerals 12-1 through 12-Lt, an antenna switch 13, transmission antennas as many as Nt (where Nt is an integer, Nt>Lt≥2) given reference numerals 14-1 through 14-Nt, an antenna selection controller 15 and an uplink receiver 16. It is meant by the transmission RF units as many as Lt that the number of transmission data streams which the wireless base station 10 can simultaneously process is Lt. The wireless base station 10 selects Lt transmission antennas 14 from Nt transmission antennas 14-1 through 14-Nt, and transmits transmission data streams by using the selected Lt transmission antennas 14. Incidentally, the term "transmission RF units 12" is used in the following explanation unless the transmission RF units 12-1 through 12-Lt needs to be distinguished from one another. Similarly, the term "transmission antennas 14" is used in the following explanation unless the transmission antennas 14-1 through 14-Nt needs to be distinguished from one another.

The space-division multiplexing modulator 11 maps an encoded sequence obtained by carrying out a specific error correction encoding process on transmission data by using a specific modulation method, and uses the mapped encoded sequence for modulation, so as to output transmission data streams as many as Lt. The space-division multiplexing modulator 11 uses, e.g., turbo coding, etc. as the specific error correction encoding process. The space-division multiplexing modulator 11 uses, e.g., QPSK (Quadrature Phase Shift Keying) or 16 QAM (Quadrature Amplitude Modulation), etc. as the specific modulation method. Incidentally, the space-division multiplexing modulator 11 can carry out a process for multiplexing a known signal (a pilot signal or a preamble signal) to be used for channel estimation (calculating a channel matrix), a control channel signal for transmitting control information, etc. in addition to data channel signals.

The transmission RF units 12 each carry out required wireless transmission processes including DA (Digital to Analog) conversion, frequency conversion (up-conversion) into radio frequencies (RF), etc. on the Lt data streams, so as to output RF signals as many as Lt.

The antenna switch 13 selects Lt transmission antennas 14 to be used for transmission and connects the selected transmission antennas 14 to the transmission RF units 12 as controlled by the antenna selection controller 15. The antenna selection controller 15 may be, e.g., digital circuit device such as an FPGA (Field Programmable Gate Array), an ASIC (Application Specific Integrated Circuit) or a DSP (Digital Signal Processor).

The transmission antennas 14 each radiate into space the RF signals provided by the transmission RF units 12 connected thereto through the antenna switch 13.

The antenna selection controller 15 controls the antenna switch 13 so as to control the connection between the transmission RF units 12 and the transmission antennas 14 in accordance with an antenna index transmitted from the mobile terminal 20.

The uplink receiver 16 receives information transmitted from an uplink transmitter 25 through a feedback channel 30, one of uplink channels provided between the wireless base station 10 and the mobile terminal 20. The information transmitted from the uplink transmitter 25 is exemplified by an antenna index described later.

The mobile terminal 20 has receiving antennas as many as Nr (where Nr is an integer, Nr≥2) given reference numerals 21-1 through 21-Nr receiving RF units as many as Lr (where Lr is an integer, 2≤Lr≤Nr) given reference numerals 22-1 through 22-Lr, a MIMO receiving process unit 23 and a controller 24. It is meant by the receiving RF units as many as Lr that the number of received data streams which the mobile terminal 20 can simultaneously process is Lr. The embodiment will be explained as to an example such that the number Nr of the receiving antennas 21 equals the number Lr of the receiving RF units 22, and the number Lr of the received data streams equals the number Lt of the transmission data streams (they all are L). Incidentally, the term "receiving antennas 21" is used in the following explanation unless the receiving antennas 21-1 through 21-Nr needs to be distinguished from one another. Similarly, the term "receiving RF units 22" is used in the following explanation unless the receiving RF units 22-1 through 22-Lr needs to be distinguished from one another.

The receiving antennas 21 each receive RF signals transmitted by the transmission antennas 14 of the wireless base station 10.

The receiving RF units 22 each carry out required wireless transmission processes including frequency conversion (down-conversion) into baseband frequencies, AD (Analog to Digital) conversion, etc. on the RF signals received by the receiving antennas 21.

The MIMO receiving process unit 23 carries out demodulation and decoding processes after separating the received signals processed by the receiving RF units 22 (i.e., the space-division multiplexed signals) for every transmission data stream, so as to output received data. The MIMO receiving process unit 23 uses, e.g., an inverse matrix of a channel matrix so as to carry out the separation process of the embodiment by OSIC (Ordered Successive Interference Cancellation) decoding. Incidentally, the method for separating the signals is not limited to the above, and another ordinary method (e.g., linear decoding such as ZF (Zero Forcing) linear decoding or MMSE (Minimum Mean Square Error) decoding, etc.) can be used.

A channel matrix is a matrix representing a state of a channel between the transmission antennas 14 and the receiving antennas 21. The channel matrix is calculated through, e.g., a correlation calculation between a received pilot signal (or a preamble signal, in the same manner hereafter) and a known pilot signal (pilot replica). Incidentally, a channel matrix H indicates a matrix of Nr rows times Nt columns representing a state of the channel between the Nt transmission antennas 14 and the Nr receiving antennas 21. Meanwhile, a channel matrix H(p) indicates a matrix of Nr rows times L columns representing a state of the channel between the selected L transmission antennas 14 corresponding to a subset (combination, in other words) p of the transmission antennas 14 and the Nr receiving antennas 21. Incidentally, the subset p is a combination of the L transmission antennas 14 selected from the Nt transmission antennas 14, where p∈P (P: a set of all subsets which the transmission antennas 14 can form).

Figure 2:
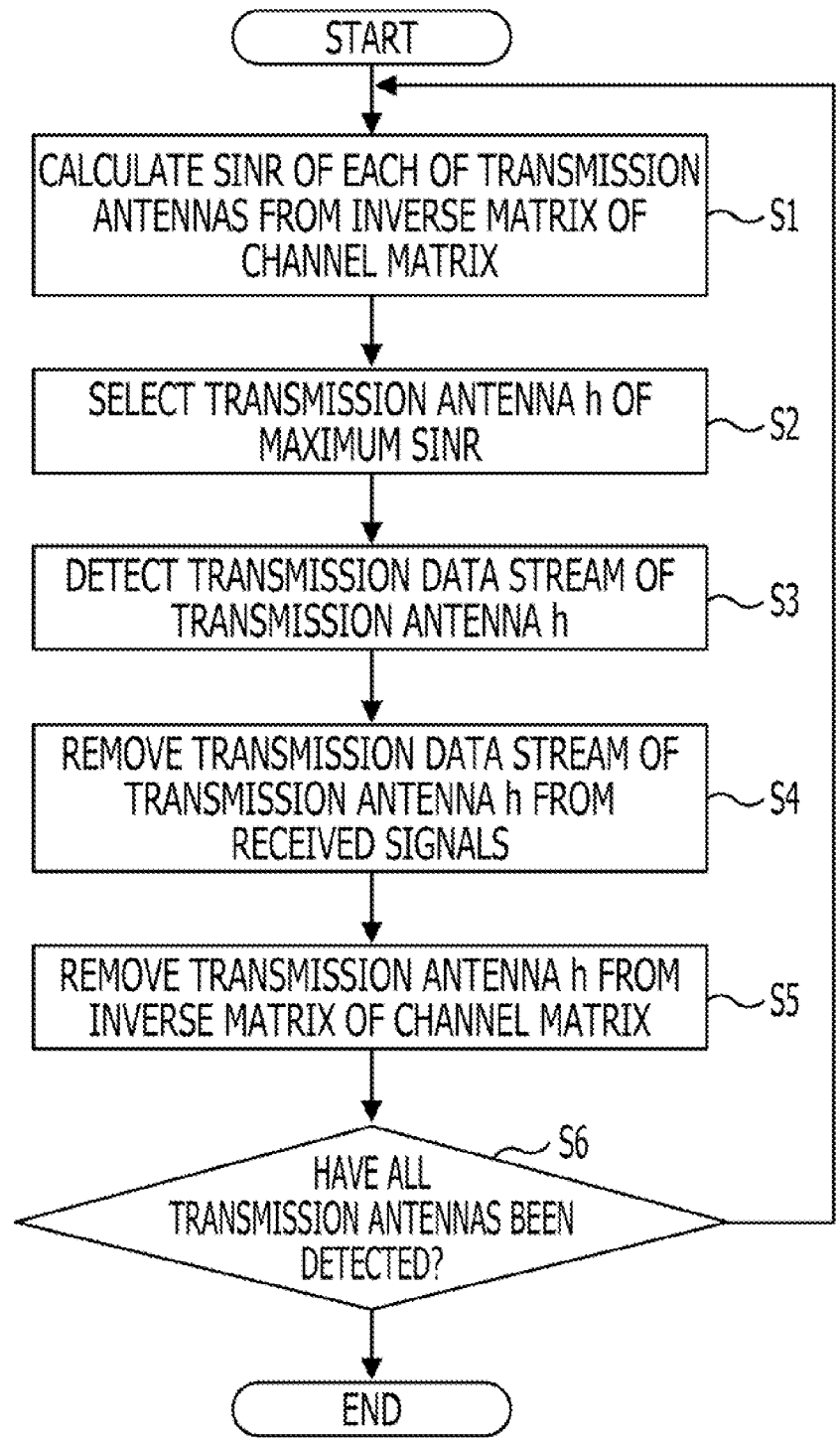
FIG. 2 is a flowchart for illustrating a flow of an OSIC decoding process carried out by a MIMO receiving process unit.

An example of an OSIC decoding process that the MIMO receiving process unit 23 carries out by using an inverse matrix of a channel matrix will be explained here with reference to FIG. 2. FIG. 2 is a flowchart for illustrating a flow of the OSIC decoding process carried out by the MIMO receiving process unit 23.

As illustrated in FIG. 2, the MIMO receiving process unit 23 calculates an SINR (Signal to Interference Noise Ratio) of each of the L transmission antennas 14 from an inverse matrix B(p) of the channel matrix H(p) representing the state of the channel between the L transmission antennas 14 and the Nr receiving antennas 21 being used for transmission of transmission data streams (step S1). The inverse matrix B(p) of the channel matrix H(p) and an SINR of an i-th (where i is an integer, 1≤i≤L) transmission antenna 14 of the L transmission antennas 14, SINR_i, are represented by Equations 1 and 2, respectively.

$$B(p) = (H(p)^H H(p) + \gamma \delta I_L)^{-1} \quad \text{(Equation 1)}$$

$$= \begin{pmatrix} b_{11} & b_{12} & \cdots & b_{1L} \\ b_{21} & b_{22} & \cdots & b_{2L} \\ \vdots & \vdots & \ddots & \vdots \\ b_{L1} & b_{L2} & \cdots & b_{LL} \end{pmatrix}$$

$$\text{SINR\_i} = \frac{1}{\gamma [(H(p)^H H(p) + \gamma \delta I_L)^{-1}]_{i,i}} - \delta \quad \text{(Equation 2)}$$

In the above equations, a variable γ represents a quotient of dividing the number L of the transmission antennas 14 being used for the transmission of the transmission data streams by an average SNR (signal Noise Ratio) ρ of the receiving antennas 21-1 through 21-Nr (i.e., L/ρ). A variable δ is a coefficient determined in accordance with a method for signal separation employed by the MIMO receiving process unit 23. A ZF linear decoding process, e.g., leads to δ=0 upon being employed. An MMSE decoding process, e.g., leads to δ=1 upon being employed. A variable $I_L$ represents a identity matrix of L rows times L columns. A term $[A]_{i,i}$ is an element on an i-th row and an i-th column in a matrix A (i.e., a diagonal component of the matrix A (mean square error), e.g., an element $b_{i,i}$ in Equation 1).

Then, the MIMO receiving process unit 23 selects a transmission antenna 14-h (where h is an integer, 1≤h≤L) of a maximum SINR (step S2). In other words, the MIMO receiving process unit 23 detects the transmission antenna 14-h of a minimum diagonal component (mean square error) of the inverse matrix B(p) (step S2). The MIMO receiving process unit 23 detects a transmission data stream transmitted from the transmission antenna 14-h detected at the step S2 (step S3). The MIMO receiving process unit 23 removes the data stream detected at the step S3 from the received signals (step S4).

Then, the MIMO receiving process unit 23 removes the transmission antenna 14-h detected at the step S2 from the inverse matrix B(p) of the channel matrix H(p) (step S5). That is, the MIMO receiving process unit 23 calculates an inverse matrix B(p) of a channel matrix H(p) of a new subset p obtained by removing the transmission antenna 14-h detected at the step S2 from the subset p. Incidentally, the operation at the step S5 can be done by the use of an "equation for updating the inverse matrix by removing one transmission antenna 14" described later in detail, or by the use of another method.

Then, the MIMO receiving process unit 23 identifies whether all the L transmission antennas 14 included in the subset p have been selected at the step S2 (step S6). Upon identifying that all the L transmission antennas 14 included in the subset p have not been selected yet (step S6: No), the MIMO receiving process unit 23 repeats the operations at and after the step S1 by using the inverse matrix B(p) calculated anew at the step S5. Meanwhile, upon identifying that all the L transmission antennas 14 included in the subset p have already been selected (step S6: Yes), the MIMO receiving process unit 23 ends the operation.

Return to FIG. 1, where the controller 24 controls the entire operation of the mobile terminal 20. The controller 24 may be, e.g., an arithmetic operation device such as a CPU (Central Processing Unit), an FPGA (Field Programmable Gate Array), an ASIC (Application Specific Integrated Circuit) or a DSP (Digital Signal Processor). The controller 24 of the embodiment selects a subset p of L transmission antennas 14 to be used for transmitting transmission data streams from the Nt transmission antennas 14. To put it specifically, the controller 24 has an inverse matrix calculating unit 241 and an antenna selecting unit 242. The inverse matrix calculating unit 241 calculates an inverse matrix B(p) of a channel matrix H(p). The antenna selecting unit 242 selects L transmission antennas 14 to be used for transmitting transmission data streams by using the inverse matrix B(p) calculated by the inverse matrix calculating unit 241 and on the basis of an antenna selection criterion described later. Incidentally, operations of the inverse matrix calculating unit 241 and the antenna selecting unit 242 will be described later in detail (see FIG. 4, etc.).

The uplink transmitter 25 transmits information to the uplink receiver 16 through the feedback channel 30, one of the uplink channels provided between the wireless base station 10 and the mobile terminal 20. An example piece of the information transmitted from the uplink transmitter 25 is an antenna index indicating the L transmission antennas 14 selected by the antenna selecting unit 242 for being used for transmitting transmission data streams, etc.

Incidentally, the MIMO receiving process unit 23 can use, in the separation process, an inverse matrix B(p) calculated on the occasion of a process in that the controller 24 selects transmission antennas 14 as the inverse matrix B(p) in Equation 1 to be used for the OSIC decoding process. In other words, the MIMO receiving process unit 23 which carries out the OSIC decoding process has to calculate no inverse matrix B(p). The MIMO receiving process unit 23 can thereby reduce a processing load.

Further, a digital circuit 240 illustrated in FIG. 1 forms the MIMO receiving process unit 23, the inverse matrix calculating unit 241 and the antenna selecting unit 242, and can be implemented by, e.g., an FPGA (Field Programmable Gate Array), an ASIC (Application Specific Integrated Circuit) or a DSP (Digital Signal Processor).

(2) Example Operation

Figure 3:
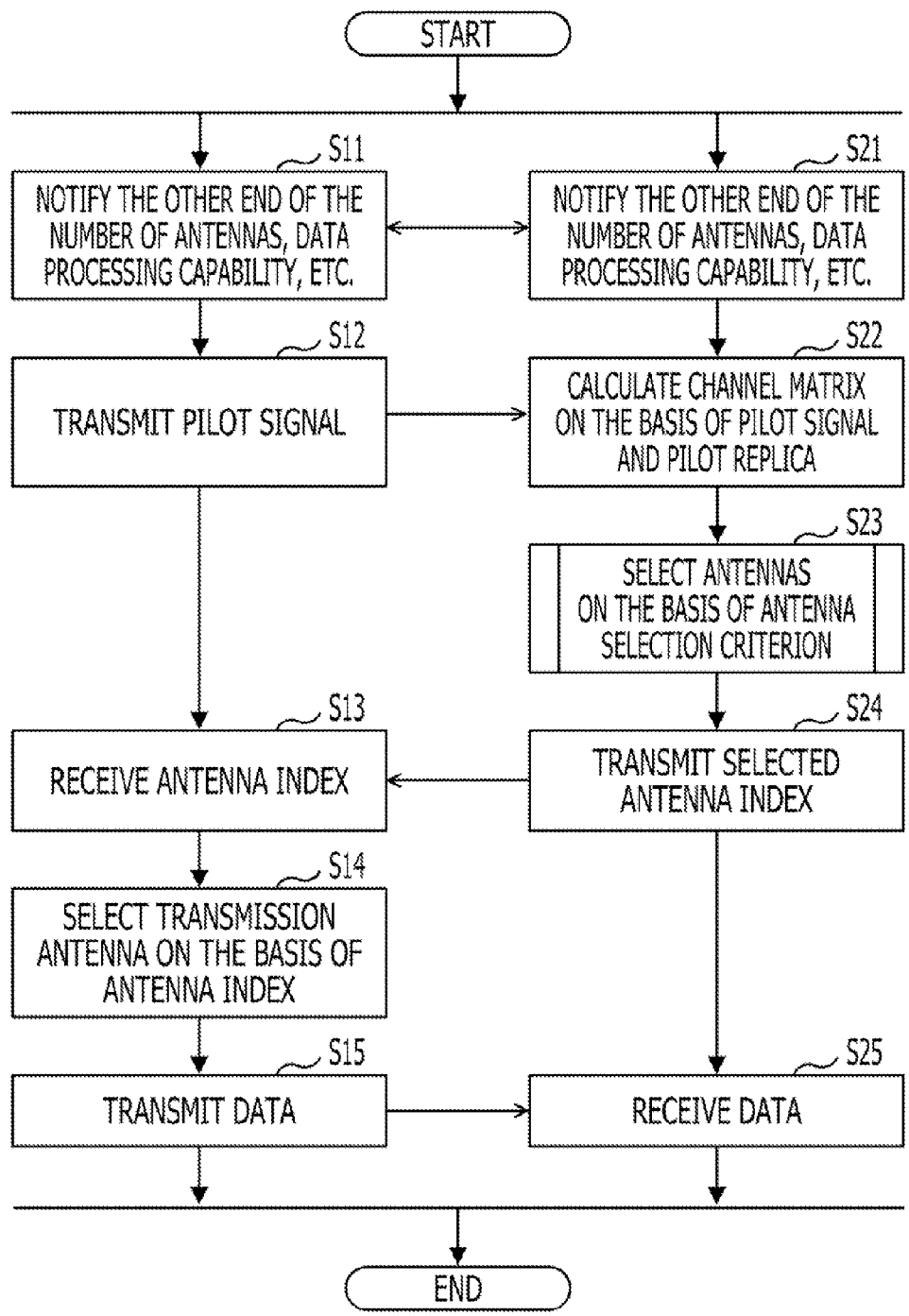
FIG. 3 is a flowchart for illustrating a flow of an example operation of the MIMO wireless communication system.

An example operation of the MIMO wireless communication system 1 will be explained with reference to FIG. 3. FIG. 3 is a flowchart for illustrating a flow of the example operation of the MIMO wireless communication system 1.

As illustrated in FIG. 3, the wireless base station 10 and the mobile terminal 20 transmits and receives pieces of information related to the number of the transmission antennas 14, the number of the receiving antennas 21, capabilities of processing data streams, etc. of themselves to and from each other in advance (steps S11 and S21). As a result, the wireless base station 10 can grasp the number of the receiving antennas 21, the processing capability, etc. of the mobile terminal 20 that the wireless base station 10 is communicating with. Similarly, the mobile terminal 20 can grasp the number of the transmission antennas 14, the processing capability, etc. of the wireless base station 10 that the mobile terminal 20 is communicating with.

Then, the wireless base station 10 transmits a pilot signal to the mobile terminal 20 (step S12). The mobile terminal 20 estimates a channel matrix H through a correlation operation between the received pilot signal and a pilot replica by using the MIMO receiving process unit 23 (step S22).

Then, the mobile terminal 20 selects a subset p of L transmission antennas 14 for which a value related to the inverse matrix B(p) meets a specific antenna selection criterion by using the controller 24 (step S23). Incidentally, the operation to select the subset p of the L transmission antennas 14 at the step S23 will be described later in detail (see FIGS. 4-10).

Then, the mobile terminal 20 transmits an antenna index indicating the selected L transmission antennas 14 to the wireless base station 10 through the feedback channel 30 by using the uplink transmitter 25 (step S24). The wireless base station 10 receives the antenna index indicating the selected L transmission antennas 14 by using the uplink receiver 16 (step S13). The wireless base station 10 controls the antenna switch 13 in accordance with the antenna index by using the antenna selection controller 15, so as to connect the transmission RF units 12 and the transmission antennas 14 (step S14). Then, the wireless base station 10 transmits transmission data streams through the connected transmission antennas 14 (step S15). The mobile terminal 20 receives the transmitted transmission data streams with the receiving antennas 21 (step S25).

(3) Example Operation to Select Subset of Transmission Antennas

The operation to select a subset p of L transmission antennas 14 to be used for transmitting transmission data streams at the step S23 in FIG. 3 will be explained. Three example operations will be presented as the operations of the embodiment in selecting a subset p of L transmission antennas 14 to be used for transmitting transmission data streams. Incidentally, a subset p of L transmission antennas 14 to be used for transmitting transmission data streams can be selected by the use of an example operation other than the three example operations described below.

(3-1) First Example Operation

Figure 4:
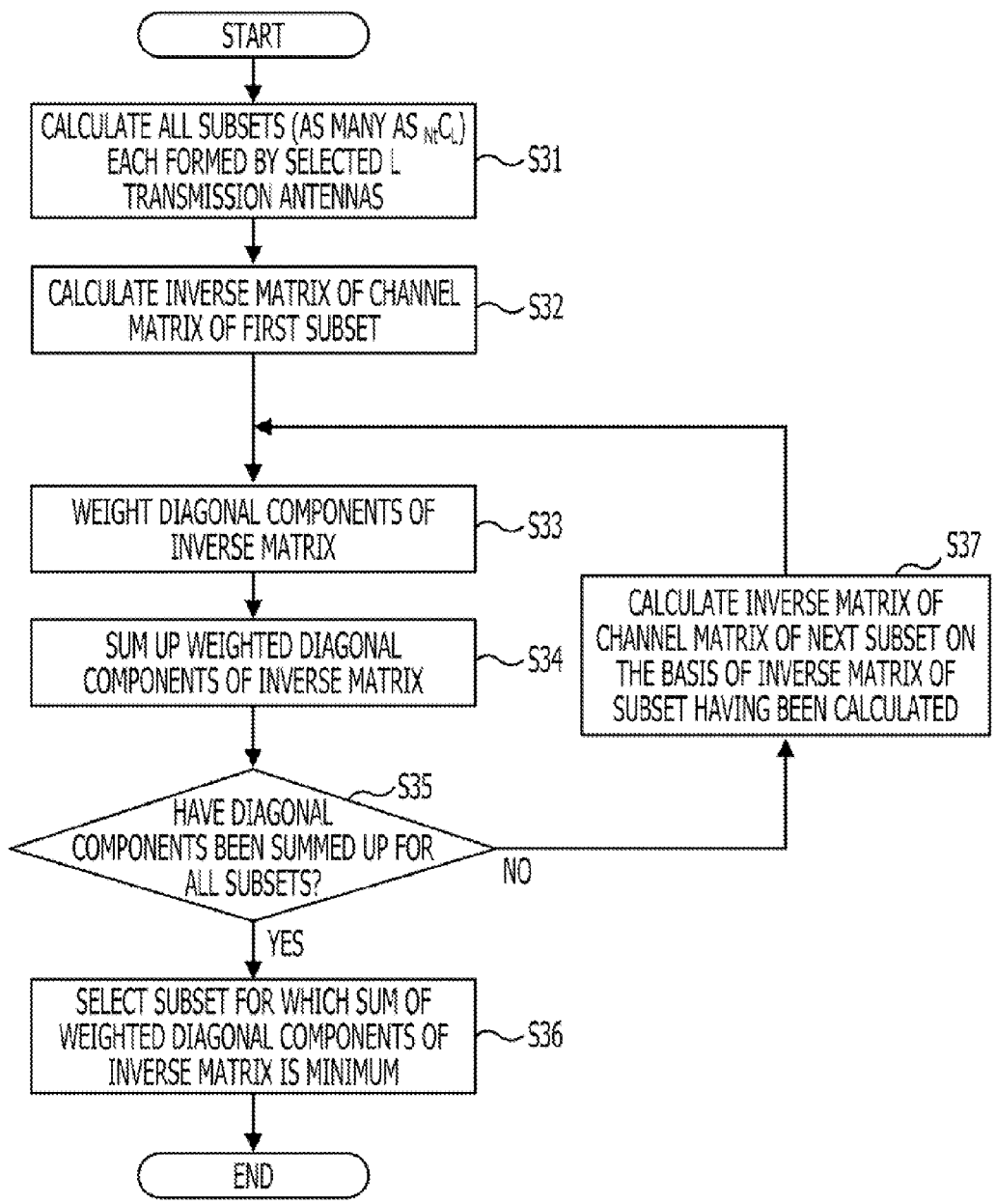
FIG. 4 is a flowchart for illustrating a flow of a first example operation.

A first example operation to select a subset p of L transmission antennas 14 to be used for transmitting transmission data streams will be explained with reference to FIG. 4. FIG. 4 is a flowchart for illustrating a flow of the first example operation.

As illustrated in FIG. 4, the inverse matrix calculating unit 241 that the controller 24 has calculates all subsets p each formed by L transmission antennas 14 selected from the Nt transmission antennas 14 (step S31). The number of the subsets p calculated at the step S31 is $_{Nt}C_L$. Let Nt=4 and L=2, e.g., then the inverse matrix calculating unit 241 calculates $_4C_2$=six subsets p (specifically, a subset p including the transmission antennas 14-1 and 14-2, a subset p including the transmission antennas 14-1 and 14-3, a subset p including the transmission antennas 14-1 and 14-4, a subset p including the transmission antennas 14-2 and 14-3, a subset p including the transmission antennas 14-2 and 14-4, and a subset p including the transmission antennas 14-3 and 14-4).

Then, the inverse matrix calculating unit 241 calculates an inverse matrix B(p) of a channel matrix H(p) of a first subset p selected from the $_{Nt}C_L$ subsets p calculated at the step S31 (e.g., a subset p selected at will) (step S32). Incidentally, the operation to calculate the inverse matrix B(p) of the first subset p will be described later in detail (see FIG. 5).

Then, the antenna selecting unit 242 properly weights each of diagonal components of the inverse matrix B(p) calculated at the step S32 (step S33). The antenna selecting unit 242 can weight, e.g., a diagonal component less heavily as the relevant diagonal component is larger. In other words, the antenna selecting unit 242 can weight a diagonal component more heavily as the relevant diagonal component is smaller. Meanwhile, the antenna selecting unit 242 can weight, e.g., relatively larger and relatively smaller diagonal components relatively less heavily and relatively more heavily, respectively. More specifically, if the diagonal components of the inverse matrix $B(p)=\{b_{11}, b_{22}, \ldots, b_{LL}$ (see Equation 1)$\}$ meets a relationship $b_{11} < b_{22} < \ldots < b_{LL}$, the antenna selecting unit 242 can provide the diagonal components $\{b_{11}, b_{22}, \ldots, b_{LL}\}$ with weights={$W_1, W_2, \ldots, W_L$} which meet a relationship $W_1 > W_2 > \ldots > W_L$, respectively.

Then, the antenna selecting unit 242 sums up the weighted diagonal components of the inverse matrix B(p) (step S34). If, e.g., the diagonal components {$b_{11}, b_{22}, \ldots, b_{LL}$} are provided with the weights={$W_1, W_2, \ldots, W_L$}, respectively, the antenna selecting unit 242 calculates $$b_{11} \times W_1 + b_{22} \times W_2 + \ldots + b_{LL} \times W_L.$$

Then, the antenna selecting unit 242 identifies whether the weighted diagonal components of the inverse matrix B(p) have been summed up (step S35) for all the $_{Nt}C_L$ subsets p (step S35).

If the antenna selecting unit 242 identifies that the diagonal components have not been summed up for all the $_{Nt}C_L$ subsets p as a result identified at the step S35 (step S35: No), the inverse matrix calculating unit 241 calculates an inverse matrix B(p) of a new subset p by using the inverse matrix B(p) of the subset p having already been calculated (step S37). In other words, the inverse matrix calculating unit 241 calculates an inverse matrix B(p) of a new subset p for which its diagonal components have not been summed up by using the inverse matrix B(p) of the subset p for which its diagonal components have already been summed up. That is, the inverse matrix calculating unit 241 calculates an inverse matrix B(p) of a second or subsequent subset p by using the inverse matrix B(p) of the subset p having already been calculated. Incidentally, the operation to calculate the inverse matrix B(p) of the second or subsequent subset p will be described later in detail (see FIGS. 6-8).

Then, the antenna selecting unit 242 properly weights each of the diagonal components of the inverse matrix B(p) calculated at the step S37 (step S33), and sums up the weighted diagonal components of the inverse matrix B(p) (step S34). The antenna selecting unit 242 continues similar operations thereafter until summing up the diagonal components of the inverse matrix B(p) for all the subsets p.

Meanwhile, upon identifying that the diagonal components have been summed up for all the $_{Nt}C_L$ subsets p as a result identified at the step S35 (step S35: Yes), the antenna selecting unit 242 selects one of the $_{Nt}C_L$ subsets p for which the sum of the weighted diagonal components of the inverse matrix B(p) is minimum (step S36). The L transmission antennas 14 included in the selected subset p turn to be the L transmission antennas 14 to be used for transmitting transmission data streams.

Incidentally, as indicated by Equation 2, the diagonal component of the inverse matrix B(p) of every subset p is an inverse number of the SINR of the transmission antenna 14. Thus, to weight a smaller diagonal component more heavily and sum up the weighted diagonal components can be said to weight a larger SINR more heavily and sum up the weighted SINRs. Besides, as illustrated in FIG. 2, the MIMO receiving process unit 23 selects, in the OSIC decoding process, the transmission antennas 14 one by one in descending order of the SINRs (in other words, in ascending order of the diagonal components). Thus, to weight a smaller diagonal component more heavily and sum up the weighted diagonal components can be said to weight a diagonal component corresponding to a transmission antenna 14 of an earlier turn of being cancelled by the OSIC decoding process more heavily and sum up the weighted diagonal components.

(3-1-1) Calculating Inverse Matrix of First Subset

The operation to "calculate the inverse matrix B(p) of the first subset p" at the step S32 in FIG. 4 will be explained. The inverse matrix calculating unit 241 of the embodiment can calculate the inverse matrix B(p) of the first subset p by using an "equation for updating the inverse matrix by adding one transmission antenna 14 (see Equation 4)" described later. The operation to calculate the inverse matrix B(p) of the first subset p by the use of the equation for updating the inverse matrix by adding one transmission antenna 14 (see Equation 4) will be explained below with reference to FIG. 5.

Figure 5:
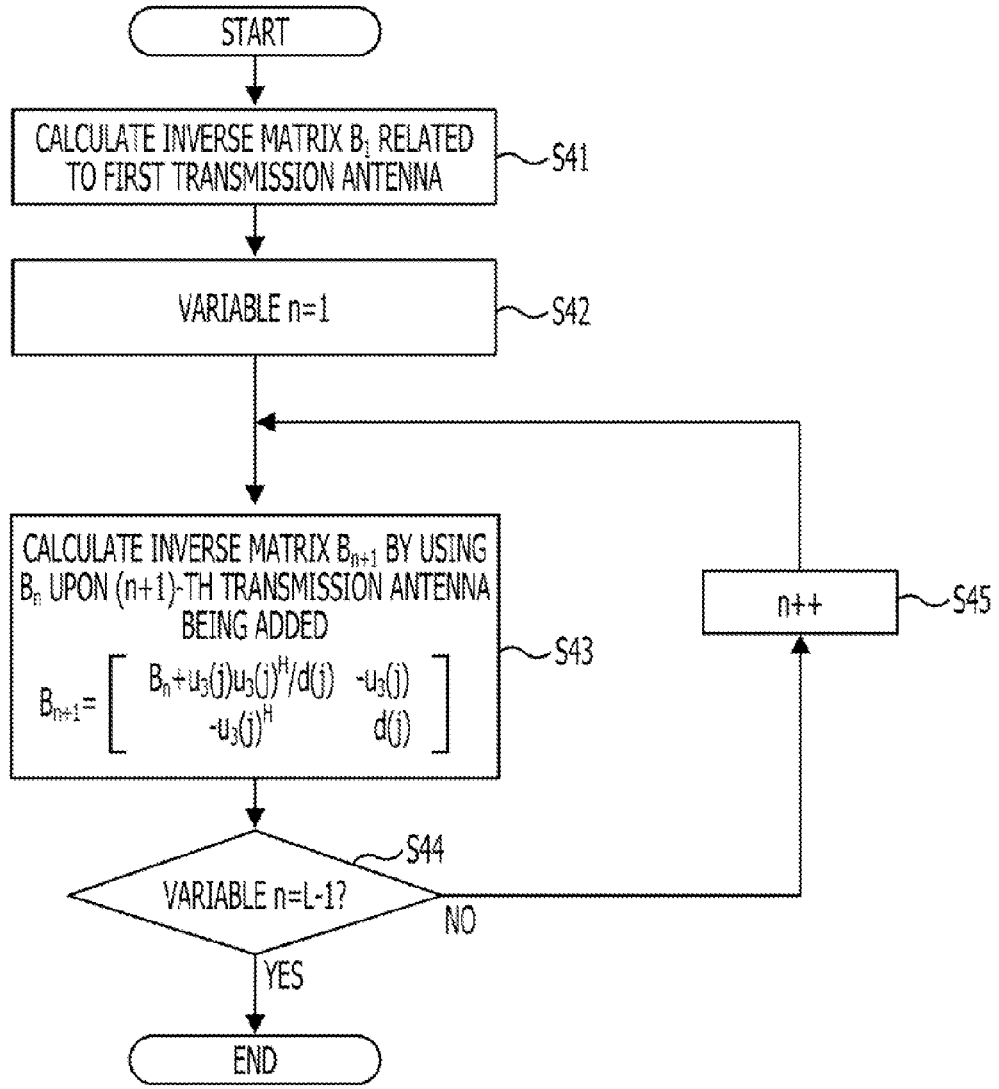
FIG. 5 is a flowchart for illustrating a flow of an operation for calculating an inverse matrix of a first subset by using an equation for updating the inverse matrix owing to addition of one transmission antenna.

As illustrated in FIG. 5, the inverse matrix calculating unit 241 uses a channel matrix $H_1$ of a first transmission antenna 14 selected from the L transmission antennas 14 included in the first subset p (e.g., one transmission antenna 14 selected at will), so as to calculate an inverse matrix $B_1$ of the channel matrix $H_1$ on the basis of Equation 3 (step S41). The inverse matrix calculating unit 241 sets a variable n to one next to, in parallel with or in series with the operation at the step S41 (step S42).

$$B_1 = (H_1^H H_1 + \gamma \delta I_1)^{-1} \qquad \text{(Equation 3)}$$

Then, the inverse matrix calculating unit 241 calculates an inverse matrix $B_2$ of a channel matrix $H_2$ of a group including the first to second transmission antennas 14 by using the inverse matrix $B_1$ of the channel matrix $H_1$ of the group including the first transmission antenna 14. Similarly, the inverse matrix calculating unit 241 calculates an inverse matrix $B_3$ of a channel matrix $H_3$ of a group including the first to third transmission antennas 14 by using the inverse matrix $B_2$ of the channel matrix $H_2$ of the group including the first to second transmission antennas 14. The inverse matrix calculating unit 241 repeats similar operations until an inverse matrix $B_L$ of a channel matrix $H_L$ of a group including the first to L-th transmission antennas 14. That is, if an (n+1)-th transmission antenna 14 excluding the first to n-th transmission antennas 14 having already been selected from the L transmission antennas 14 included in the first subset p is selected anew, the inverse matrix calculating unit 241 calculates an inverse matrix $B_{n+1}$ of a channel matrix $H_{n+1}$ of a group including the first to (n+1)-th transmission antennas 14 by using the inverse matrix $B_n$ of the channel matrix $H_n$ of the group including the first to n-th transmission antennas 14 (step S43). The inverse matrix calculating unit 241 of the embodiment calculates the inverse matrix $B_{n+1}$ by using the inverse matrix $B_n$ on the basis of Equation 4.

$$B_{n+1} = \begin{bmatrix} B_n + \dfrac{u_3(j) u_3(j)^H}{d(j)} & -u_3(j) \\ -u_3(j)^H & d(j) \end{bmatrix} \qquad \text{(Equation 4)}$$

Variables $u_3(j)$ and $d(j)$ included above are matrices defined by Equations 5 and 6, respectively.

$$u_2(j) = d(j) u_2(j) \qquad \text{(Equation 5)}$$

$$d(j) = \dfrac{1}{g(j) - u_1(j)^H u_2(j)} \qquad \text{(Equation 6)}$$

Variables $u_1(j)$, $u_2(j)$ and $g(j)$ included above are matrices defined by Equations 7 to 9, respectively.

$$u_1(j) = H_n^H h(j) \qquad \text{(Equation 7)}$$

$$u_2(j) = B_n u_1(j) \qquad \text{(Equation 8)}$$

$$g(j) = h(j)^H h(j) + \delta \gamma \qquad \text{(Equation 9)}$$

A variable h(j) included above is a channel matrix of the (n+1)-th transmission antenna 14 to be selected anew.

Then, the inverse matrix calculating unit 241 identifies whether the variable n is equal to L−1 (step S44). If the variable n is identified as being equal to L−1 (step S44: Yes), the last-calculated inverse matrix $B_{n+1}(=B_L)$ turns to be the inverse matrix B(p) of the subset p. Then, the inverse matrix calculating unit 241 outputs the calculated inverse matrix B(p) of the subset p to the antenna selecting unit 242. Meanwhile, if the variable n is identified as being unequal to L−1 (step S44: No), the inverse matrix calculating unit 241 incrementally updates the variable n by one (step S45), and then repeats the operation at the step S43.

Incidentally, the inverse matrix calculating unit 241 can calculate the inverse matrix B(p) of the first subset p by using another method different from the method illustrated in FIG. 5. The inverse matrix calculating unit 241 can directly calculate the inverse matrix B(p), e.g., by using Equation 1 described above.

(3-1-2) Calculating Inverse Matrix of One of Second and Successive Subsets

The operation to "calculate the inverse matrix B(p) of the second subset p" at the step S37 in FIG. 4 will be explained. The inverse matrix calculating unit 241 of the embodiment can use an "equation for updating the inverse matrix by removing one transmission antenna 14 (see Equation 11)" and the "equation for updating the inverse matrix by adding one transmission antenna 14 (see Equation 4)" described above, and calculate an inverse matrix B(p) of a new subset p by using the inverse matrix B(p) of the subset p having already been calculated (see FIG. 7). An example subset p formed by transmission antennas 14 of L=7 selected from transmission antennas of Nt=8, 14-1 through 14-8, will be explained. As illustrated in FIG. 6, assume that the transmission antennas 14-1 through 14-7 have been selected for a first subset p1. At this time, an inverse matrix B(p2) of a second subset p2 including the transmission antennas 14-1 through 14-6 and 14-8 can be calculated by removal and addition of elements corresponding to the transmission antennas 14-7 and 14-8 from and to an inverse matrix B(p1) of the first subset p1, respectively. Similarly, an inverse matrix B(p3) of a third subset p3 including the transmission antennas 14-1 through 14-5, 14-7 and 14-8 can be calculated by removal and addition of elements corresponding to the transmission antennas 14-6 and 14-7 from and to the inverse matrix B(p2) of the second subset p2, respectively. Inverse matrices B(p3) through B(p8) of other subsets p3 through p8 can be similarly calculated by removal and addition of the transmission antennas 14 surrounded by solid lines.

Figure 8:
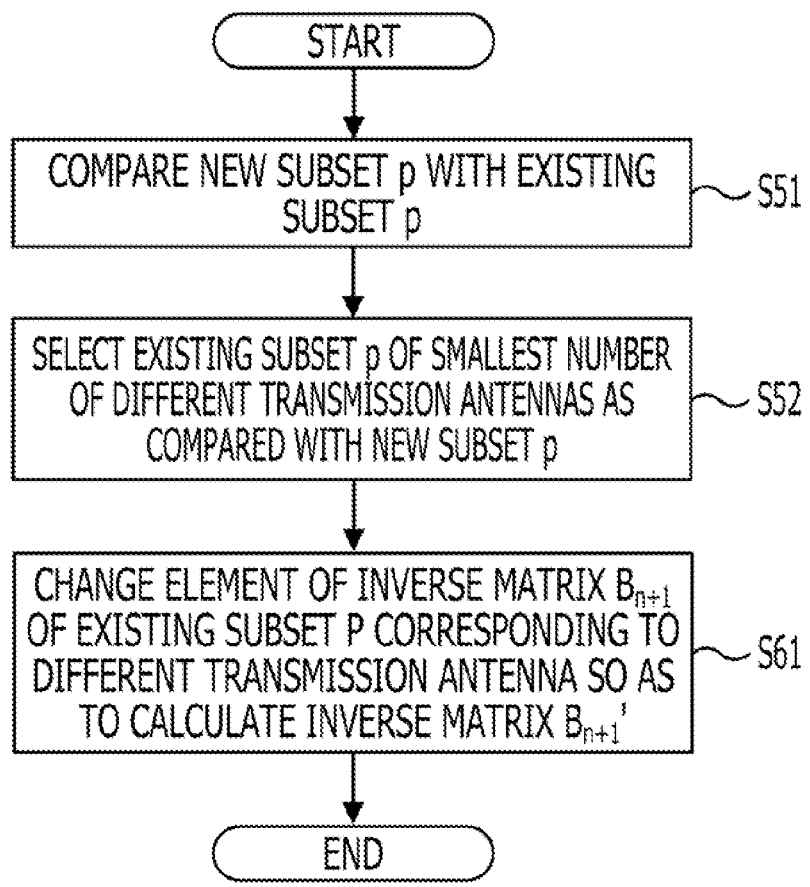
FIG. 8 is a flowchart for illustrating a flow of an operation to calculate an inverse matrix $B(p)$ of one of second and successive subsets by using an "equation for updating the inverse matrix by changing one transmission antenna"

Meanwhile, the inverse matrix calculating unit 241 can use an "equation for updating the inverse matrix by changing one transmission antenna 14 (see Equations 12 and 13)" and calculate an inverse matrix B(p) of a new subset p by using the inverse matrix B(p) of the subset p having already been calculated (see FIG. 8). An example subset p formed by transmission antennas 14 of L=7 are selected from transmission antennas of Nt=8, 14-1 through 14-8, will be explained. As illustrated in FIG. 6, assume that the transmission antennas 14-1 through 14-7 have been selected for a first subset p1. At this time, an inverse matrix B(p2) of a second subset p2 including the transmission antennas 14-1 through 14-6 and 14-8 can be calculated by a change of an element corresponding to the transmission antenna 14-7 to an element corresponding to the transmission antenna 14-8 of an inverse matrix B(p1) of the first subset p1. Similarly, an inverse matrix B(p3) of a third subset p3 including the transmission antennas 14-1 through 14-5, 14-7 and 14-8 can be calculated by a change of an element corresponding to the transmission antenna 14-6 to an element corresponding to the transmission antenna 14-7 of the inverse matrix B(p2) of the second subset p2. Inverse matrices B(p3) through B(p8) of other subsets p3 through p8 can be similarly calculated by changes of the transmission antennas 14 surrounded by solid lines.

The inverse matrix calculating unit 241 can calculate the inverse matrix B(p) of one of the second and successive subsets p, however, by using another method. The inverse matrix calculating unit 241 can directly calculate the inverse matrix B(p) of one of the second and successive subsets p, e.g., substantially the same as the operation to calculate the inverse matrix B(p) of the first subset p described above.

(3-1-2-1) Process for Updating Inverse Matrix by Removing and Adding One Transmission Antenna 14

Figure 7:
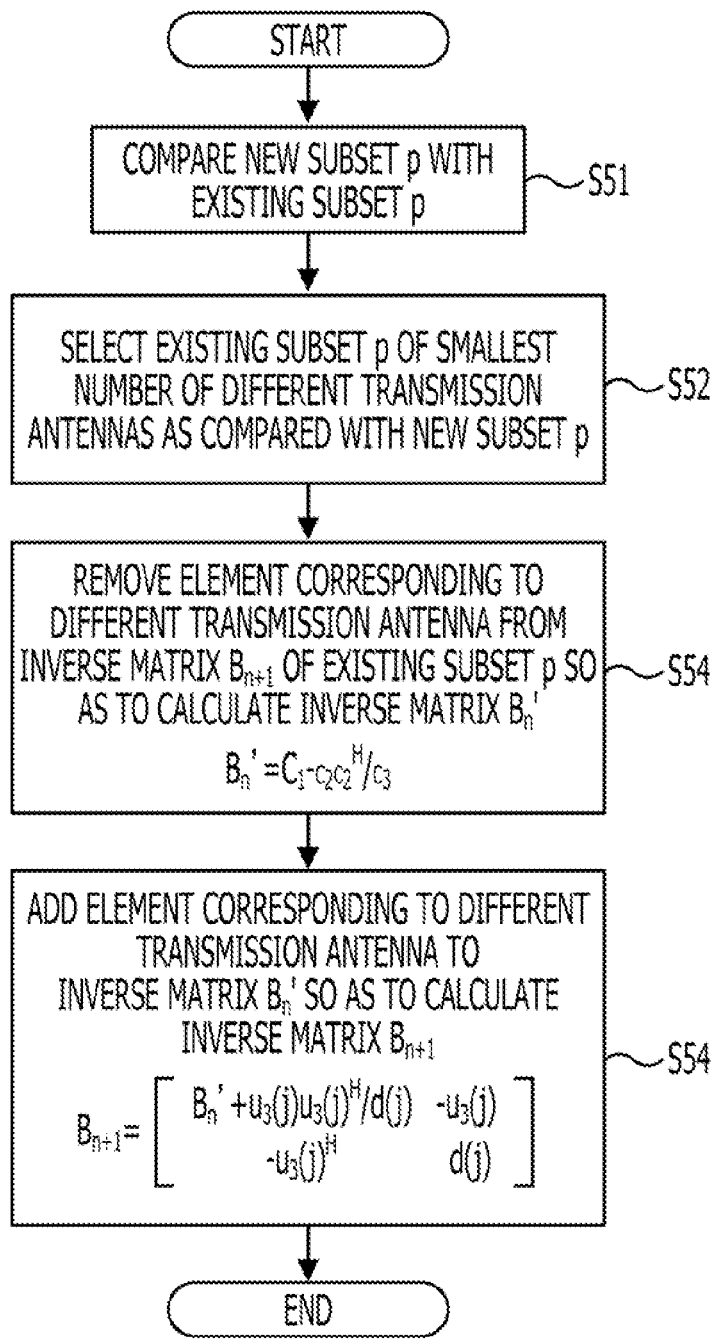
FIG. 7 is a flowchart for illustrating a flow of an operation to calculate an inverse matrix $B(p)$ of one of second and successive subsets by using an "equation for updating the inverse matrix by removing one transmission antenna" and an "equation for updating the inverse matrix by adding one transmission antenna"

An operation to calculate the inverse matrix B(p) of one of the second and successive subsets p by using the "equation for updating the inverse matrix by removing one transmission antenna 14 (see Equation 11)" and the "equation for updating the inverse matrix by adding one transmission antenna 14 (see Equation 4)" described above will be explained with reference to FIG. 7. FIG. 7 is a flowchart for illustrating a flow of the operation to calculate the inverse matrix B(p) of one of the second and successive subsets p by using the "equation for updating the inverse matrix by removing one transmission antenna 14 (see Equation 11)" and the "equation for updating the inverse matrix by adding one transmission antenna 14 (see Equation 4)".

As illustrated in FIG. 7, the inverse matrix calculating unit 241 compares new one subset p for which an inverse matrix B(p) is desired to be calculated with at least one existing subset p for which an inverse matrix B(p) has already been calculated (step S51). The inverse matrix calculating unit 241 selects, from at least one of existing subsets p for each of which an inverse matrix B(p) has already been calculated, one existing subset p of the smallest number of different transmission antennas 14 as compared with the new one subset p (step S52).

Then, the inverse matrix calculating unit 241 removes an element corresponding to a different transmission antenna 14 from the inverse matrix B(p) of the existing subset p selected at the step S52 (step S53). That is, the inverse matrix calculating unit 241 removes an element corresponding to the transmission antenna 14 included in the existing subset p and not included in the new subset p from the inverse matrix B(p) of the existing subset p selected at the step S52. If, e.g., an x-th (where x is an integer, 1≤x≤L) transmission antenna 14 included in the existing subset p is not included in the new subset p, the inverse matrix calculating unit 241 removes an element corresponding to the x-th transmission antenna 14 of the existing subset p from the inverse matrix B(p) of the existing subset p.

The inverse matrix calculating unit 241 operates as follows, so as to remove the element corresponding to the x-th transmission antenna 14 from the inverse matrix $B(p)=B_{n+1}$ of the existing subset p including the first to (n+1)-th transmission antennas 14. To begin with, the inverse matrix calculating unit 241 calculates an inverse matrix $B_{n+1}'$ such that each of elements of a 1X-th row and an x-th column is exchanged with each of elements of a last row and a last column. Besides, the inverse matrix calculating unit 241 separates the elements of the inverse matrix $B_{n+1}'$ in a form indicated by Equation 10. Then, the inverse matrix calculating unit 241 calculates an inverse matrix $B_n'$ such that the element corresponding to the x-th transmission antenna 14 is removed from the inverse matrix $B(p)=B_{n+1}$ of the existing subset p on the basis of Equation 11.

$$B'_{n+1} = \begin{pmatrix} C_1 & -c_2 \\ -c_2^H & c_3 \end{pmatrix} \quad \text{(Equation 10)}$$

$$B'_n = C_1 - \frac{c_2 c_2^H}{c_3} \quad \text{(Equation 11)}$$

The variables $C_1$, $c_2$ and $c_3$ included above represent a matrix of n rows times n columns, a vector of n rows times one column, and a scalar of one row times one column, respectively.

Then, the inverse matrix calculating unit 241 adds an element corresponding to the different transmission antenna 14 to the inverse matrix $B_n'$ calculated at the step S53 (step S54). That is, the inverse matrix calculating unit 241 adds the element not included in the existing subset p and included in the new subset p to the inverse matrix $B_n'$ calculated at the step S53. If, e.g., a y-th (where y is an integer, 1≤y≤L) transmission antenna 14 included in the new subset p is not included in the existing subset p, the inverse matrix calculating unit 241 adds an element corresponding to the y-th transmission antenna 14 of the new subset p to the inverse matrix $B_n'$. At this time, the inverse matrix calculating unit 241 can add the element corresponding to the y-th transmission antenna 14 of the new subset p to the inverse matrix $B_n'$ by using Equation 4 described above. A resultantly obtained inverse matrix $B_{n+1}$ turns to be an inverse matrix B(p) of the new subset p.

(3-1-3) Process for Updating Inverse Matrix by Changing One Transmission Antenna 14

An operation to calculate the inverse matrix B(p) of the second subset p by using an "equation for updating the inverse matrix by changing one transmission antenna 14 (see Equations 12 and 13)" will be explained with reference to FIG. 8. FIG. 8 is a flowchart for illustrating a flow of the operation to calculate the inverse matrix B(p) of the second subset p by using the "equation for updating the inverse matrix by changing one transmission antenna 14 (see Equations 12 and 13)". Incidentally, an operation similar to that illustrated in FIG. 7 is given a same step number and its detailed explanation is omitted.

As illustrated in FIG. 8, the inverse matrix calculating unit 241 compares new one subset p for which an inverse matrix B(p) is desired to be calculated with at least one existing subset p for which an inverse matrix B(p) has already been calculated (step S51). The inverse matrix calculating unit 241 selects, from at least one of existing subsets p for each of which an inverse matrix B(p) has already been calculated, one existing subset p of the smallest number of different transmission antennas 14 as compared with the new one subset p (step S52).

Then, the inverse matrix calculating unit 241 changes an element corresponding to a different transmission antenna 14 for the inverse matrix B(p) of the existing subset p selected at the step S52 (step S61). That is, the inverse matrix calculating unit 241 changes an element corresponding to the transmission antenna 14 included in the existing subset p and not included in the new subset p of the inverse matrix B(p) of the existing subset p selected at the step S52 into an element corresponding to a transmission antenna 14 not included in the existing subset p and included in the new subset p. If, e.g., an x-th transmission antenna 14 included in the existing subset p is not included in the new subset p and a y-th transmission antenna 14 included in the new subset p is not included in the existing subset p, the inverse matrix calculating unit 241 changes an element corresponding to the x-th transmission antenna 14 of the inverse matrix B(p) of the existing subset p into an element corresponding to the y-th transmission antenna 14 of the new subset p.

The inverse matrix calculating unit 241 here changes an element of the inverse matrix B by using Equations 12 and 13. To put it specifically, a matrix P produced if an x-th column of any matrix Q is replaced with a column vector h is calculated by the use of an intermediate matrix D calculated on the basis of Equation 12, and Equation 13 defined by the intermediate matrix D. Let the inverse matrix B(p) of the existing subset p be the matrix Q and elements corresponding to the transmission antennas 14 not included in the existing subset p and included in the new subset p be the column vector h, then the matrix P turns to be the inverse matrix B(p) of the new subset p.

$$D^{-1} = (Q^H Q)^{-1} - \frac{(Q^H Q)^{-1}_{*x}\left(f^H (Q^H Q)^{-1}\right)}{1 + f^H (Q^H Q)^{-1}_{*x}} \quad \text{(Equation 12)}$$

$$(P^H P)^{-1} = D^{-1} - \frac{D^{-1}(f + e_j c^H c) D^{-1}_{x*}}{1 + D^{-1}_{x*}(f + e_j c^H c)} \quad \text{(Equation 13)}$$

Variables c, f, "$Q_{*x}$", $D^{-1}_{x*}$ and $e_j$ included above represent $h - Q_{*x}$, $Q^H c$, the x-th column vector of the matrix Q, an x-th row vector of $D^{-1}$, and a unit vector, respectively. That is, a j-th element of $e_j$ is one, and the others are 0.

(3-2) Second Example Operation

Figure 9:
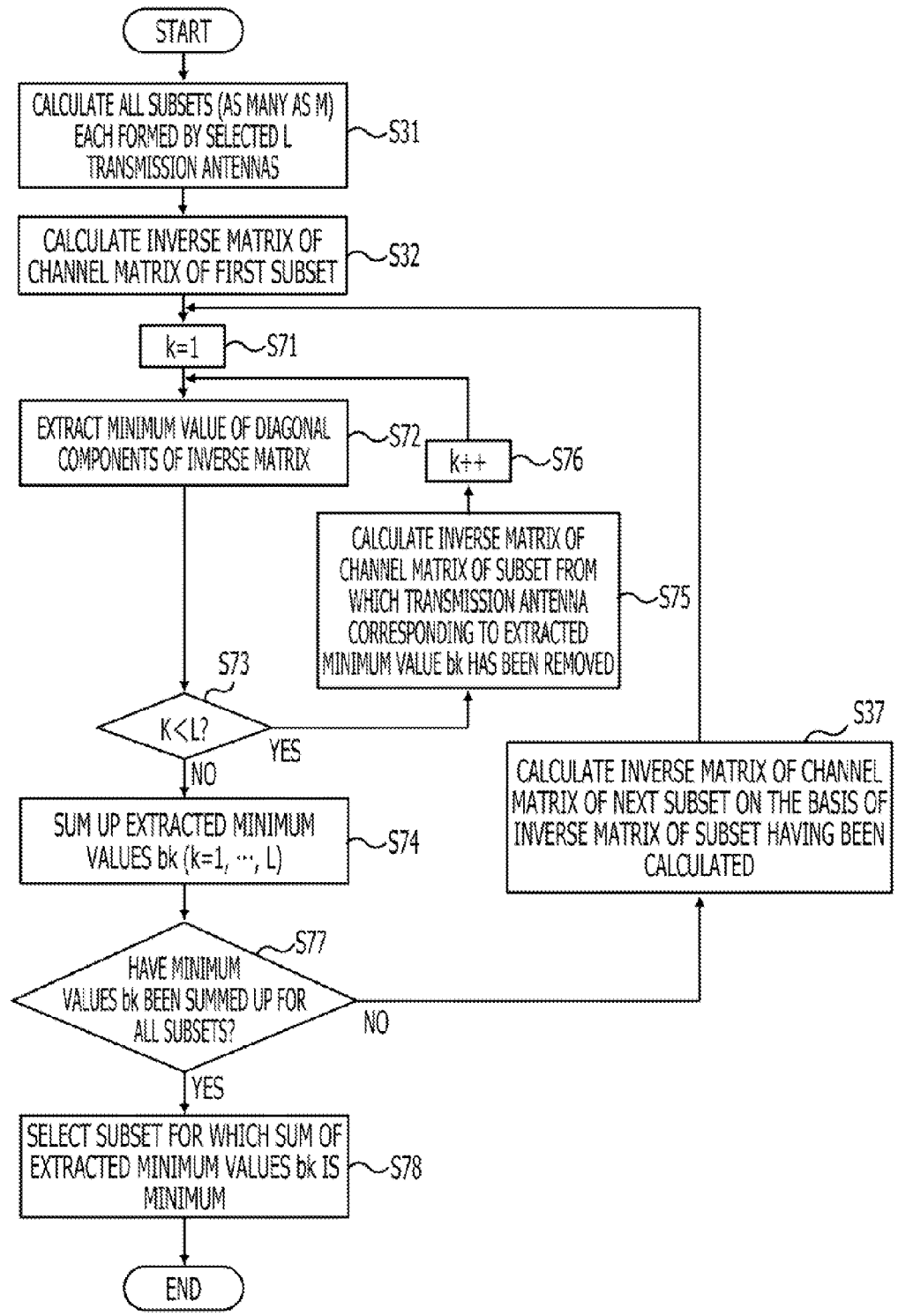
FIG. 9 is a flowchart for illustrating a flow of a second example operation.

A second example operation to select a subset p of L transmission antennas 14 to be used for transmitting a transmission data stream will be explained with reference to FIG. 9. FIG. 9 is a flowchart for illustrating a flow of the second example operation. Incidentally, an operation which is a same as that of the first example operation is given a same step number and its detailed explanation is omitted.

As illustrated in FIG. 9, the inverse matrix calculating unit 241 that the controller 24 has calculates all subsets p each formed by L transmission antennas 14 are selected from the Nt transmission antennas 14 (step S31). The inverse matrix calculating unit 241 calculates an inverse matrix B(p) of a channel matrix H(p) of a first subset p selected from the $_{Nt}C_L$ subsets p calculated at the step S31 (e.g., a subset p selected at will) (step S32). Then, the inverse matrix calculating unit 241 sets a variable k to 1 (step S71).

Then, the inverse matrix calculating unit 241 extracts a minimum value bk of the diagonal components of the inverse matrix B(p) of the first subset p calculated at the step S32 (step S72). Let, e.g., the diagonal components of the inverse matrix B(p) of the first subset p be $\{b_{11}, b_{22}, \ldots, b_{LL}\}$ in which $b_{22}$ is the minimum component. Then, the inverse matrix calculating unit 241 extracts "$b_{22}$" as the minimum value bk of the diagonal components. Then, the inverse matrix calculating unit 241 identifies whether the variable k is smaller than L or not (step S73).

Upon identifying the variable k as being smaller than L as a result identified at the step S73 (step S73: Yes), the inverse matrix calculating unit 241 calculates an inverse matrix B(p) of a subset p from which a transmission antenna 14 corresponding to the minimum value bk extracted at the step S72 has been removed by using the "equation for updating the inverse matrix by removing one transmission antenna 14 (see Equation 11)" described above (step S75). That is, the inverse matrix calculating unit 241 calculates the inverse matrix B(p) $=B_n$ of the subset p from which the transmission antenna 14 corresponding to the minimum value bk has been removed from the inverse matrix B(p)$=B_{n+1}$ in which the minimum value bk has been extracted.

Then, after incrementally updating the variable k (step S76), the inverse matrix calculating unit 241 extracts a minimum value bk of diagonal components of an inverse matrix calculated anew at the step S75 (step S72). The inverse matrix calculating unit 241 repeats similar operations thereafter until the variable k turns to be L and over.

Meanwhile, upon the variable k being identified as not being smaller than L as a result identified at the step S73 (step S73: No), the antenna selecting unit 242 sums up all the minimum values bk={b1, b2, . . . , bL} extracted by the inverse matrix calculating unit 241 (step S74).

Then, the antenna selecting unit 242 identifies whether the minimum values bk={b1, b2, . . . , bL} have been summed up for all the $_{Nt}C_L$ subsets p calculated at the step S31 (step S77).

Upon the antenna selecting unit 242 identifying the minimum values bk={b1, b2, . . . , bL} as not having been summed up for all the $_{Nt}C_L$ subsets as a result identified at the step S77 (step S77: No), the inverse matrix calculating unit 241 calculates an inverse matrix B(p) of a new subset p by using the inverse matrix B(p) of the subset p having already been calculated (step S37). Then, the operations at the steps S71-S76 are done for the inverse matrix B(p) calculated anew at the step S37.

Meanwhile, upon identifying the minimum values bk={b1, b2, . . . , bL} as having been summed up for all the $_{Nt}C_L$-subsets p as a result identified at the step S77 (step S77: Yes), the antenna selecting unit 242 selects one subset p of a minimum sum of the minimum values bk={b1, b2, . . . , bL} from the $_{Nt}C_L$ subsets p (step S78). The L transmission antennas 14 included in the selected subset p turn to be the L transmission antennas 14 to be used for transmitting transmission data streams.

Incidentally, as indicated by Equation 2, the diagonal component of the inverse matrix B(p) of every subset p is an inverse number of the SINR of the transmission antenna 14. Thus, to extract minimum values of diagonal components and sum up the extracted minimum values can be said to extract maximum values of the SINR and sum up the extracted maximum values of the SINR. Besides, as illustrated in FIG. 2, the MIMO receiving process unit 23 selects, by the OSIC decoding process, the transmission antennas 14 one by one in descending order of the SINRs (in other words, in ascending order of the diagonal components). Thus, to extract minimum values of diagonal components and sum up the extracted minimum values can be said to extract the diagonal component corresponding to the transmission antenna 14 of the earlier turn of being cancelled by the OSIC decoding process every time the inverse matrix B(p) is updated and sum up the extracted diagonal components.

(3-3) Third Example Operation

Figure 10:
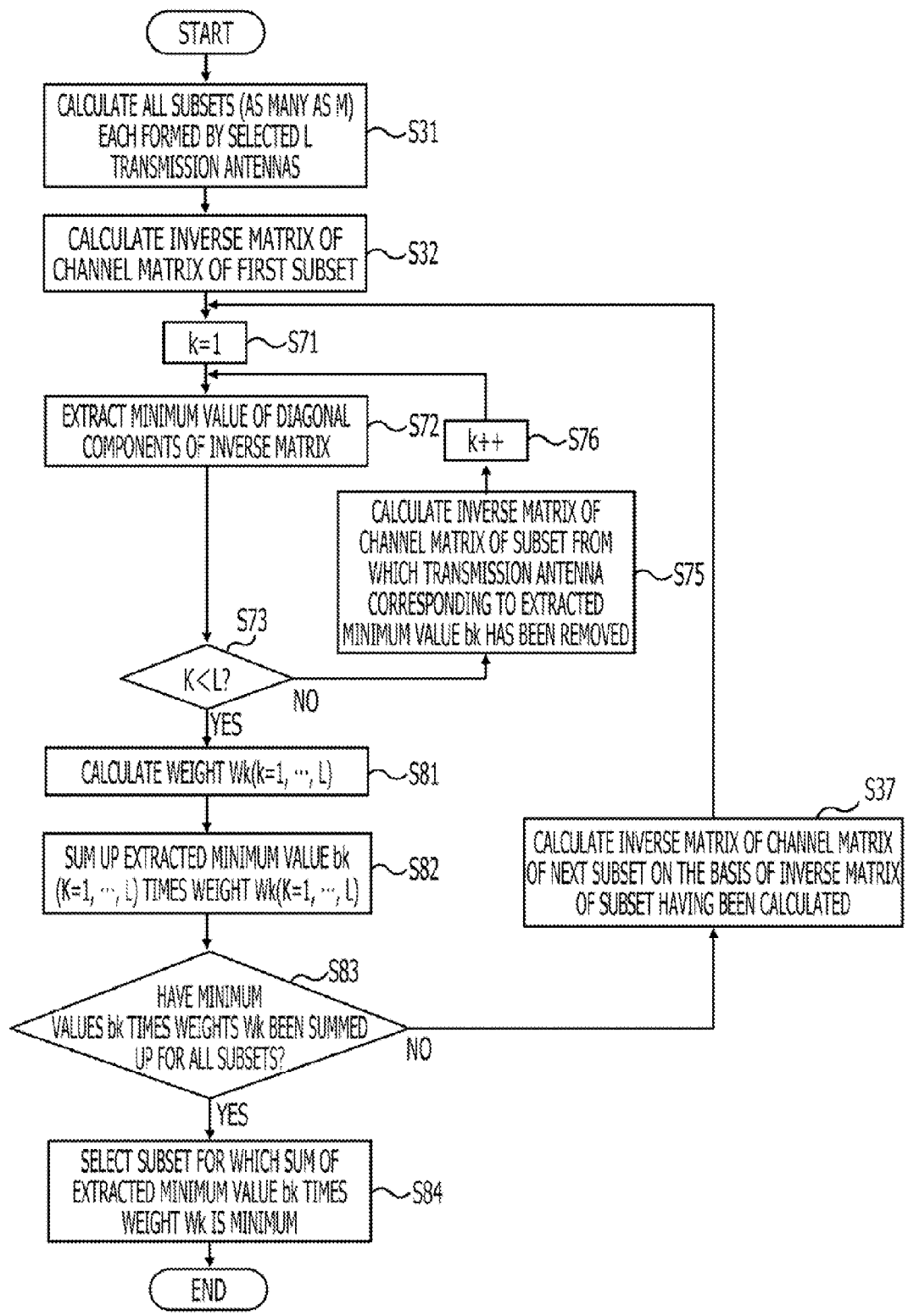
FIG. 10 is a flowchart for illustrating a flow of a third example operation.

A third example operation to select a subset p of L transmission antennas 14 to be used for transmitting transmission data streams will be explained with reference to FIG. 10. FIG. 10 is a flowchart for illustrating a flow of the third example operation. Incidentally, an operation which is a same as that of the first and second example operations is given a same step number and its detailed explanation is omitted.

As illustrated in FIG. 10, the inverse matrix calculating unit 241 that the controller 24 has calculates all subsets p each formed by L transmission antennas 14 selected from the Nt transmission antennas 14 (step S31). The inverse matrix calculating unit 241 calculates an inverse matrix B(p) of a channel matrix H(p) of a first subset p selected from the $_{Nt}C_L$-subsets p calculated at the step S31 (e.g., a subset p selected at will) (step S32). Then, the inverse matrix calculating unit 241 sets a variable k to 1 (step S71). Then, the inverse matrix calculating unit 241 extracts a minimum value bk of the diagonal components of the inverse matrix B(p) of the first subset p calculated at the step S32 (step S72). Then, the inverse matrix calculating unit 241 identifies whether the variable k is smaller than L or not (step S73).

Upon identifying the variable k as being smaller than L as a result identified at the step S73 (step S73: Yes), the inverse matrix calculating unit 241 calculates an inverse matrix B(p) of a subset p from which a transmission antenna 14 corresponding to the minimum value bk extracted at the step S72 has been removed by using the "equation for updating the inverse matrix by removing one transmission antenna 14 (see Equation 11)" described above (step S75). Then, after incrementally updating the variable k (step S76), the inverse matrix calculating unit 241 extracts a minimum value bk of diagonal components of an inverse matrix calculated anew at the step S75 (step S72). The inverse matrix calculating unit 241 repeats similar operations thereafter until the variable k turns to be L and over.

Meanwhile, upon the variable k being identified as not being smaller than L as a result identified at the step S73 (step S73: No), the antenna selecting unit 242 provides the minimum values bk={b1, b2, . . . , bL} with specific weights Wk={W1, W2, . . . , WL}, respectively (step S81). The antenna selecting unit 242 can provide, e.g., the minimum value bk of the earlier turn of being extracted with the heavier weight Wk. To put it specifically, the antenna selecting unit 242 can provide, e.g., weights Wk which meets a relationship W1>W2> . . . >WL. Meanwhile, the antenna selecting unit 242 can provide weights Wk which meets a relationship W1=1, W2=(L−1)/L, . . . , WL=1/L (i.e., Wk=(L+1−k)/L). Meanwhile, the antenna selecting unit 242 can provide weights Wk which meets a relationship W1=b1/(b1+b2+ . . . +bL), W2=b2/(b1+b2+ . . . +bL), . . . , WL=bL/(b1+b2+ . . . +bL) (i.e., Wk=bk/(b1+b2+ . . . +bL)). Meanwhile, the antenna selecting unit 242 can provide the minimum value bk with a lighter weight as the relevant minimum value bk is smaller. In other words, the antenna selecting unit 242 can provide the minimum value bk with a heavier weight as the relevant minimum value bk is larger. Meanwhile, the antenna selecting unit 242 can provide, e.g., relatively larger and relatively smaller minimum values bk with relatively lighter and relatively heavier weights Wk, respectively.

Then, the antenna selecting unit 242 sums up the minimum values bk provided with the weights Wk (step S82). The antenna selecting unit 242 calculates, e.g., b1×W1+b2×W2+ . . . +bL×WL.

Then, the antenna selecting unit 242 identifies whether the sum of the minimum values bk times the weights Wk has been calculated or not for all the $_{Nt}C_L$ subsets p calculated at the step S31 (step S83).

Upon the antenna selecting unit 242 identifying the sum of the minimum values bk times the weights Wk as not having been calculated for all the $_{Nt}C_L$ subsets p (step S83: No), the inverse matrix calculating unit 241 calculates an inverse matrix B(p) of a new subset p by using the inverse matrix B(p) of the subset p having already been calculated (step S37). Then, the operations of the steps S71-S83 are done for the inverse matrix B(p) calculated anew at the step S37.

Meanwhile, upon identifying the sum of the minimum values bk times the weights Wk as having been calculated for all the $_{Nt}C_L$ subsets p (step S83: Yes), the antenna selecting unit 242 selects one subset p of a minimum sum of the minimum values bk times the weights Wk from the $_{Nt}C_L$ subsets p (step S84). The L transmission antennas 14 included in the selected one subset p turn to be the L transmission antennas to be used for transmitting transmission data streams.

As described above, the MIMO communication system 1 of the embodiment can preferably select, from the Nt transmission antennas 14, a subset p including L transmission antennas to be used for transmitting transmission data streams. Moreover, as having employed an antenna selection criterion which fits the OSIC decoding process, the MIMO communication system 1 provided with the MIMO receiving process unit 23 which carries out the OSIC decoding process can preferably select a subset p including L transmission antennas to be used for transmitting transmission data streams.

Figure 11:
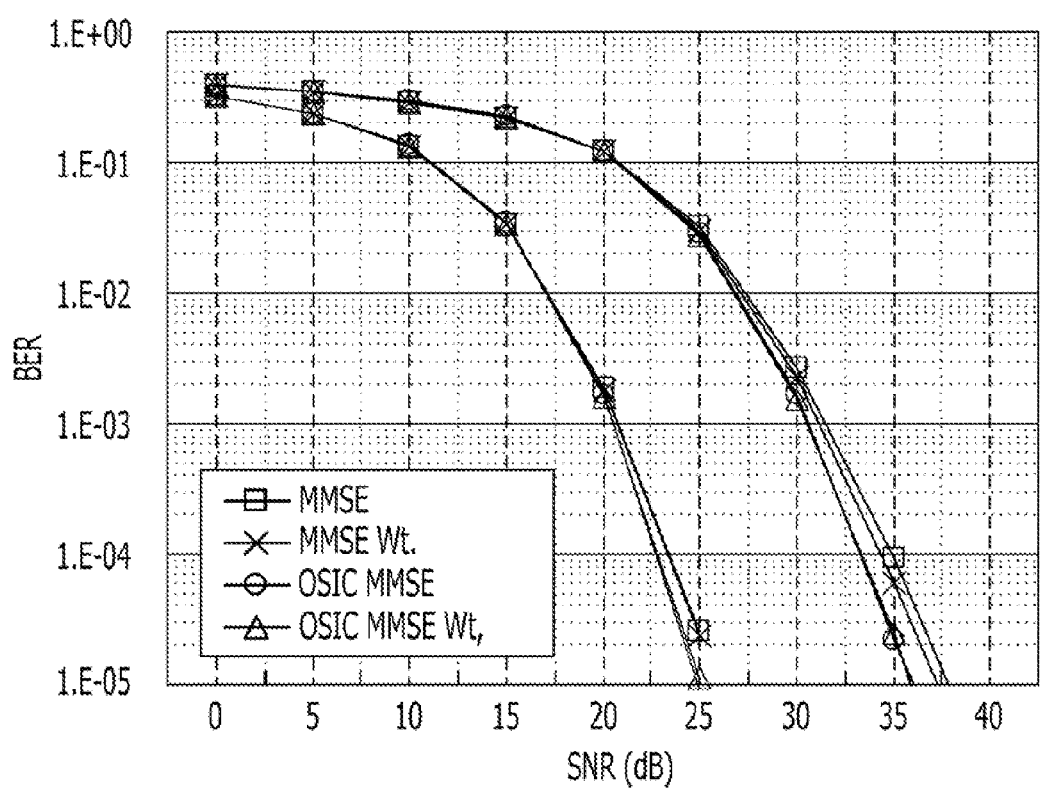
FIG. 11 is a graph for illustrating quality of communication performed by the use of a subset including the L transmission antennas selected in accordance with the first to third example operations of the MIMO communication system of the embodiment.

Quality of communication performed by the use of the subset p including the L transmission antennas 14 selected in accordance with the first to third example operations of the MIMO communication system 1 of the embodiment will be explained here with reference to FIG. 11. FIG. 11 referred to here is a graph for illustrating quality of communication performed by the use of the subset p including the L transmission antennas 14 selected in accordance with the first to third example operations of the MIMO communication system 1 of the embodiment.

FIG. 11 illustrates a quality of communication (SNR and BER (Bit Error Rate)) performed by the use of the subset p including the L transmission antennas 14 selected in accordance with the first example operation of the MIMO communication system 1 of the embodiment as indicated by x-shaped symbols. FIG. 11 illustrates a quality of communication performed by the use of the subset p including the L transmission antennas 14 selected in accordance with the second example operation of the MIMO communication system 1 of the embodiment as indicated by circular symbols. FIG. 11 illustrates a quality of communication performed by the use of the subset p including the L transmission antennas 14 selected in accordance with the third example operation of the MIMO communication system 1 of the embodiment as indicated by triangular symbols. FIG. 11 illustrates a quality of communication performed by the use of the subset p including the L transmission antennas 14 selected in accordance with an example operation for comparison of the MIMO communication system 1 of the embodiment which is different from the first to third example operations as indicated by square symbols. Incidentally, the example operation for comparison is to select a subset p for which the sum of the diagonal components is minimum.

FIG. 11 demonstrates that the qualities of communication performed by the use of the subset p including the L transmission antennas 14 selected in accordance with the first to third example operations are better than the quality of communication performed by the use of the subset p including the L transmission antennas 14 selected in accordance with the example operation for comparison.

Besides, the MIMO communication system 1 of the embodiment can calculate an inverse matrix B(p) of a new subset p by applying a specific updating equation (e.g., Equations 4 or 11-13 described above) to the inverse matrix B(p) of the existing subset p. The MIMO communication system 1 can thereby calculate the inverse matrix B(p) of the subset p through a relatively simple arithmetic operation.

Besides, the MIMO communication system 1 of the embodiment can calculate an inverse matrix B(p) of a new subset p to which the (n+1)-th transmission antenna 14 is added anew by applying a specific updating equation (e.g., Equation 4 described above) to the inverse matrix B(p) of the subset p including the first to n-th transmission antennas 14. The MIMO communication system 1 can thereby calculate the inverse matrix B(p) of the subset p through a relatively simple arithmetic operation.

Incidentally, if the MIMO receiving process unit 23 which carries out a linear decoding process such as a ZF linear or MMSE decoding process is used, it is preferable to select a subset p for which a sum of diagonal components of an inverse matrix B(p) such that smaller one of the diagonal components is weighted less heavily (in other words, larger one of the diagonal components is weighted more heavily) is minimum.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A wireless communication system comprising:
a transmitting apparatus; and
a receiving apparatus including
N antennas (where N is an integer, N≥2) configured to perform multiple input multiple output wireless communication with the transmitting apparatus, and
a processor configured
to calculate each of inverse matrixes of each of channel matrixes of each of combinations of L antennas (where L is an integer, 1≤L<N) selected among the N antennas, by calculating at least one inverse matrix of the inverse matrixes based on at least one channel matrix of the channel matrixes, and by calculating remaining inverse matrix other than the at least one inverse matrix of the inverse matrixes based on the at least one inverse matrix, and
to select an antenna combination among the combinations of L antennas, the combination whose reference value satisfies a specified condition, the reference value being calculated based on an inverse matrix of the inverse matrixes which corresponds to the combination, the specified condition being for determining whether L antennas indicated by the combination fits a successive interference cancellation process or not.

2. The wireless communication system according to claim 1, wherein the reference value for antenna selection includes a value related to an inverse matrix and determined in accordance with an order in which the L antennas are removed by the successive interference cancellation process.

3. The wireless communication system according to claim 1, wherein
the reference value for antenna selection includes a sum of diagonal components of an inverse matrix, each of the diagonal components being multiplied with a lighter weight as a value of the relevant diagonal component increases; and
the processor selects a combination for which the reference value for antenna selection is minimum as the L antennas to be used for communication.

4. The wireless communication system according to claim 1, wherein
the reference value for antenna selection includes a sum of diagonal components of an inverse matrix, each of the diagonal components being multiplied with a lighter weight as the relevant diagonal component corresponds to an antenna removed by the successive interference cancellation process on a later turn; and the processor selects a combination for which the reference value for antenna selection is minimum as the L antennas to be used for communication.

5. The wireless communication system according to claim 1, wherein the reference value for antenna selection includes a sum of signal-to-interference ratios indicated by an inverse matrix, each of the signal-to-interference ratios being multiplied with a lighter weight as a value of the relevant signal-to-interference ratio decreases; and the processor selects a combination for which the reference value for antenna selection is maximum as the L antennas to be used for communication.

6. The wireless communication system according to claim 1, wherein the processor calculates an inverse matrix of a channel matrix of a group of antennas remaining after an antenna of a minimum diagonal component of an inverse matrix is removed from a group including first to n-th antennas of the N antennas (where n is an integer, $1 \le n \le L$) by using an inverse matrix of a channel matrix of the group including the first to n-th antennas through an arithmetic operation;

the processor extracts, every time an inverse matrix is calculated, a minimum value of diagonal components of the inverse matrix;

the reference value for antenna selection includes a sum of the minimum values extracted; and the processor selects a combination for which the reference value for antenna selection is minimum as the L antennas to be used for communication.

7. The wireless communication system according to claim 1, wherein the processor successively calculates an inverse matrix of a channel matrix of a group of antennas remaining after an antenna is successively removed from a group including first to n-th antennas of the N antennas (where n is an integer, $1 \le n \le L$) in same order as the antenna is removed by the successive interference cancellation process by using an inverse matrix before the antenna is removed through an arithmetic operation;

the processor extracts, every time an inverse matrix, a diagonal component of the inverse matrix corresponding to the removed antenna;

the reference value for antenna selection includes a sum of the diagonal components extracted; and the processor selects a combination for which the reference value for antenna selection is minimum as the L antennas to be used for communication.

8. The wireless communication system according to claim 1, wherein the processor calculates an inverse matrix of a channel matrix of a group of antennas remaining after an antenna of a maximum signal-to-interference ratio indicated by an inverse matrix is removed from a group including first to n-th antennas of the N antennas (where n is an integer, $1 \le n \le L$) by using an inverse matrix of a channel matrix of the group including the first to n-th antennas through an arithmetic operation;

the processor extracts, every time an inverse matrix is calculated, a maximum value of the signal-to-interference ratio indicated by the inverse matrix;

the reference value for antenna selection includes a sum of the maximum values extracted; and the processor selects a combination for which the reference value for antenna selection is maximum as the L antennas to be used for communication.

9. The wireless communication system according to claim 1, wherein:

the processor calculates an inverse matrix of a channel matrix of a group of antennas remaining after an antenna of a minimum diagonal component of an inverse matrix is removed from a group including first to n-th antennas of the N antennas (where n is an integer, $1 \le n \le L$) by using an inverse matrix of a channel matrix of the group including the first to n-th antennas through an arithmetic operation;

the processor extracts, every time an inverse matrix is calculated, a minimum value of diagonal components of the inverse matrix;

the reference value for antenna selection includes a sum of the minimum values extracted, each of the minimum values being multiplied with a lighter weight as the extracted minimum value increases; and the processor selects a combination for which the reference value for antenna selection is minimum as the L antennas to be used for communication.

10. The wireless communication system according to claim 1, wherein the processor successively calculates an inverse matrix of a channel matrix of a group of antennas remaining after an antenna is successively removed from a group including first to n-th antennas of the N antennas (where n is an integer, $1 \le n \le L$) in same order as the antenna is removed by the successive interference cancellation process by using an inverse matrix before the antenna is removed through an arithmetic operation;

the processor extracts, every time an inverse matrix is calculated, a diagonal component of the inverse matrix corresponding to the removed antenna;

the reference value for antenna selection includes a sum of the diagonal components extracted, each of the diagonal components being multiplied with a lighter weight as a value of the extracted diagonal component increases; and the processor selects a combination for which the reference value for antenna selection is minimum as the L antennas to be used for communication.

11. The wireless communication system according to claim 1, wherein:

the processor calculates an inverse matrix of a channel matrix of a group of antennas remaining after an antenna of a maximum signal-to-interference ratio indicated by an inverse matrix is removed from a group including first to n-th antennas of the N antennas (where n is an integer, $1 \le n \le L$) by using an inverse matrix of a channel matrix of the group including the first to n-th antennas through an arithmetic operation;

the processor extracts, every time an inverse matrix is calculated, a maximum value of the signal-to-interference ratio indicated by the inverse matrix;

the reference value for antenna selection includes a sum of the maximum values extracted, each of the maximum values being multiplied with a lighter weight as the extracted maximum value is smaller decreases; and the processor selects a combination for which the reference value for antenna selection is maximum as the L antennas to be used for communication.

12. The wireless communication system according to claim 6, wherein the processor is further configured to carry out the successive interference cancellation process so as to successively cancel a signal transmitted by the L antennas in same order as the antenna is removed in a case where the the inverse matrix is calculated.

13. The wireless communication system according to claim 1, wherein the processor is further configured to transmit a piece of information related to the L antennas selected to an opposite side device.

14. The wireless communication system according to claim 1, wherein the processor is further configured to perform communication with an opposite side device by using the L antennas selected.

15. A wireless communication method for performing multiple input multiple output communication by the use of a wireless communication device having N antennas (where N is an integer, N≥2), the wireless communication method comprising:

calculating each of inverse matrixes of each of channel matrixes of each of combinations of L antennas (where L is an integer, 1≤L<N) selected among the N antennas, by calculating at least one inverse matrix of the inverse matrixes based on at least one channel matrix of the channel matrixes, and by calculating remaining inverse matrix other than the at least one inverse matrix of the inverse matrixes based on the at least one inverse matrix; and selecting an antenna combination among the combinations of L antennas, the combination whose reference value satisfies a specified condition, the reference value being calculated based on an inverse matrix of the inverse matrixes which corresponds to the combination, the specified condition being for determining whether L antennas indicated by the combination fits a successive interference cancellation process or not.

* * * * *